(12) United States Patent
Lin

(10) Patent No.: US 6,898,066 B1
(45) Date of Patent: May 24, 2005

(54) STRUCTURE OF CHIP TYPE ELECTROLYTIC CAPACITOR

(76) Inventor: Chieh-Fu Lin, No. 7, Ta Yeou 2st., Ta Fa Ind. Dist., Ta Liau Siang, Kaohsiung (TW)

( * ) Notice: Subject to any disclaimer, the term of this patent is extended or adjusted under 35 U.S.C. 154(b) by 0 days.

(21) Appl. No.: 10/873,980

(22) Filed: Jun. 21, 2004

(51) Int. Cl.$^7$ ................................................. H01G 4/00
(52) U.S. Cl. .................... 361/301.3; 361/535; 361/536; 361/537; 361/517; 361/518; 361/519
(58) Field of Search .............................. 361/301.3, 517, 361/518, 519, 535, 536, 537, 303, 307, 308.1, 321.6; 174/52.3, 52.4, 52.1

(56) References Cited

U.S. PATENT DOCUMENTS

| | | | |
|---|---|---|---|
| 5,650,759 A | * | 7/1997 | Hittman et al. ............. 333/182 |
| 5,847,919 A | * | 12/1998 | Shimizu et al. ............. 361/517 |
| 6,118,646 A | * | 9/2000 | Yang et al. .............. 361/301.3 |
| 6,292,348 B1 | * | 9/2001 | Lin .......................... 361/301.3 |
| 6,442,014 B1 | * | 8/2002 | Lin .......................... 361/301.3 |

* cited by examiner

Primary Examiner—Dean A. Reichard
Assistant Examiner—Nguyen T. Ha
(74) Attorney, Agent, or Firm—Pro-Techtor International Services

(57) ABSTRACT

The present invention relates to a structure of chip type electrolytic capacitor, which comprises a casing cover and a partition to separate space of casing cover into a dielectric chamber and a buffer chamber, a dielectric which includes lead pins, holes on the partition for the lead pins pass through. The dielectric is installed in the dielectric chamber, and lead pins pass through the holes on partition and extend to the buffer chamber. The buffer chamber is sealed with a bottom cover which also includes holes for lead pins. A stuff of epoxide is filled into the buffer chamber to fix the dielectric and its lead pins. A top cover is to seal the dielectric chamber for filling electrolyte. The casing cover is made with high strength engineering plastic by plastic injection machine. A supersonic welding and the epoxide adhesive solidification package technologies replace rubber packing. This skill of the art can enhance airtight and reduce volume of chip type electrolytic capacitor to anti shock and electrolyte leaking.

10 Claims, 12 Drawing Sheets

STRUCTURE OF CHIP TYPE ELECTROLYTIC CAPACITOR

BACKGROUND OF THE INVENTION

1. Field of the Invention

The present invention relates to a structure of chip type electrolytic capacitor, and especially to a manufacturing process of applications of supersonic welding, automatic glue dispensing, and electrolyte metered filling technology. The process method and the simplified designed chip type structure of this invention enhance quality and reliability of electrolytic capacitor, and produce slim electronics for consumer electronic products.

2. Description of the Related Art

Referring to FIG. 1, an exploded perspective view of a prior chip type capacitor is illustrated. A casing cover 110, a dielectric 120, an inner cover plate 130, and an outer cover plate 140 form the chip type capacitor, and the dielectric 120 is placed in the receiving chamber 111 of the casing cover 110. After adding electrolyte, the inner cover plate 130 covers the casing cover 110. Two lead pins 121 of the dielectric 120 pass through two through holes 131 of the inner cover plate 130. After filling glue on the inner cover plate 130, the outer cover plate 140 covers the casing cover 110 and the two are combined sticky. The two lead pins 121 pass through the two through holes 141 of the outer cover plate 140.

In this prior chip type capacitor, when the dielectric 120 is placed in the receiving chamber 111 of the casing cover 110 and after the electrolyte is filled thereinto, the inner wall of the receiving chamber 111 of the casing cover 110 will adhere the electrolyte. Therefore, the inner cover plate 130 and the outer cover plate 140 are not be firmly secured to the casing cover 110. Thereby, the dielectric 120 may separate from the casing cover 110. The capacitor cannot be functioned correctly. Also, The lead pins 121 may be polluted with the prior filled electrolyte and cause soldering problems.

A method, according to a U.S. Pat. No. 6,442,014, uses an elastomer 230 having an outer diameter slightly larger than the inner wall of a receiving shell 210 to increase the tightness of the hermetically sealed, shown in FIG. 1B. An open receiving chamber 211 is provided in the receiving shell 210. The receiving chamber 211 may be received with a dielectric 220 and an elastomer 230. An open end of the receiving shell 210 has a wall frame 212. A cover plate 240 may be placed in the wall frame 212. The dielectric 220 has two lead pins 221. The dielectric 220 is received in the receiving chamber 211 of the receiving shell 210. A lead pins 221 may protrude out of the receiving shell 210.

Although this method can improve sealing to solve problem of foregoing prior art, but the lead pins 221 may still be polluted with the prior filled electrolyte. And also, the elastomer 230 is too soft to support the lead pins 221 to be treated with force bending to make use of capacitor, the structure of combination between the dielectric 220 and the lead pins 221 is fragile and easily to be broken.

Another prior skill in this art described in a U.S. Pat. No. 6,292,348 uses resin glue filling to fix and seal said lead pins 121 and the dielectric 220. This skill although may replace said elastomer 230 and simplify process, but the resin glue may shrink in solidification and cause leak, and heat-unstable may also cause deformed.

SUMMARY OF THE INVENTION

Accordingly, the primary object of the present invention is to provide a slim chip type electrolytic capacitor, wherein a simple structure is used to increase the airtight of capacitor, prevent pollution on lead pins, and to simplify production process to enhance yield rate.

A casing cover is made by plastic injection machine using high strength engineering plastic. An aluminum foil, lead pins, and an insulation paper are assembled to a dielectric. The dielectric is installed into the casing cover, and electrolyte is metered filled in. A glue dispenser moving control system applies a multipoint dispensing of mechatronics and control technology to achieve high-speed gluing with no burr and no surplus glue to clean up required. A low viscosity liquid multipoint metered filling/vacuum technology enhances speed of electrolyte adsorption to fill the bill of requirement for mass production. A supersonic welding and an epoxide adhesive solidification package technology replace rubber packing with. The Epoxide is heatproof and shrink-resistant in solidification so that the epoxide can seal completely and prevent leaking of electrolyte. This skill of the art can enhance airtight and reduce volume of chip type electrolytic capacitor to anti shock and electrolyte leaking.

DETAILED DESCRIPTION OF THE INVENTION

To achieve the object, the present invention provides a structure of electrolytic capacitor. A partition is set in a casing cover to separate into a dielectric chamber and a buffer chamber. A dielectric places in the dielectric chamber, and two lead pins of the dielectric pass through two holes of the partition. A bottom cover comprising two holes seals the buffer chamber and let the dielectric pass through. A stuff of epoxide fills the buffer chamber to firm the dielectric and the lead pins. A top cover seals the dielectric chamber to fill with electrolyte. The epoxide can replace the elastomer described in prior art, with no further tools in process of manufacture.

The various objects and advantages of the present invention will be more readily understood from the following detailed description when read in conjunction with the appended drawing.

Figure 1A:
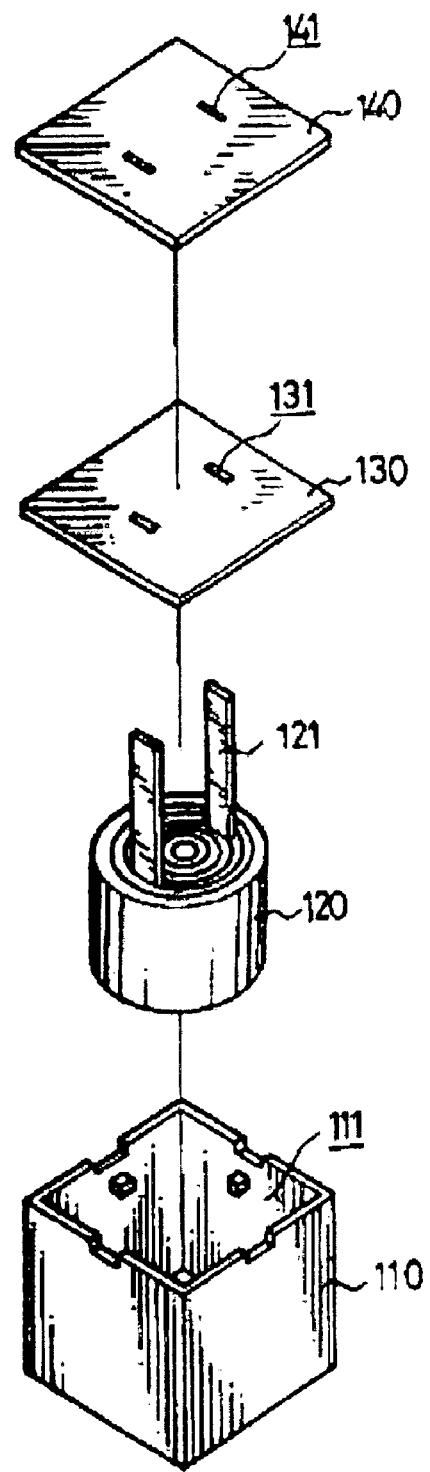
FIG. 1A is an exploded perspective view of a prior art chip type capacitor.
Figure 1B:
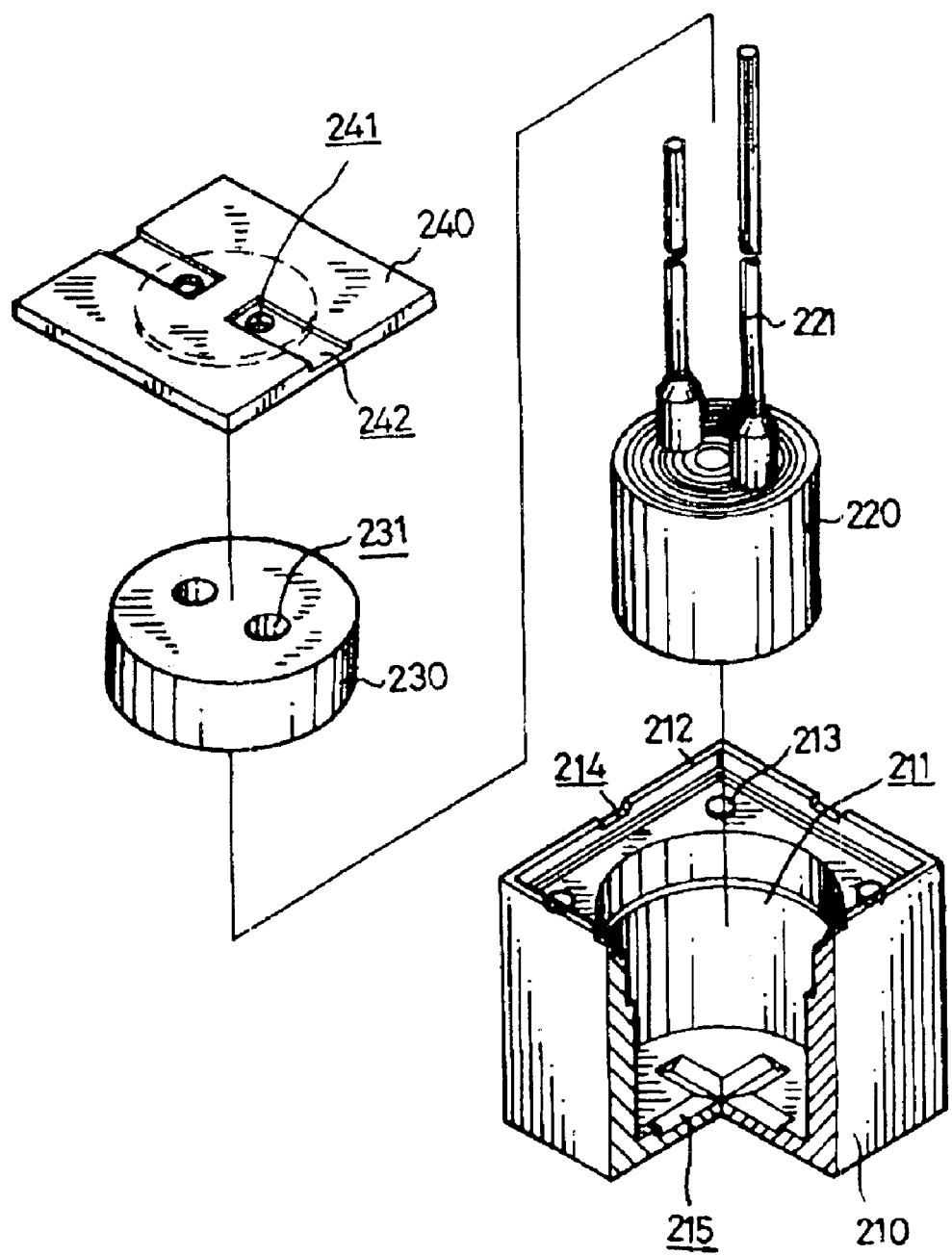
FIG. 1B is an exploded perspective view of another prior art chip type capacitor.
Figure 2:
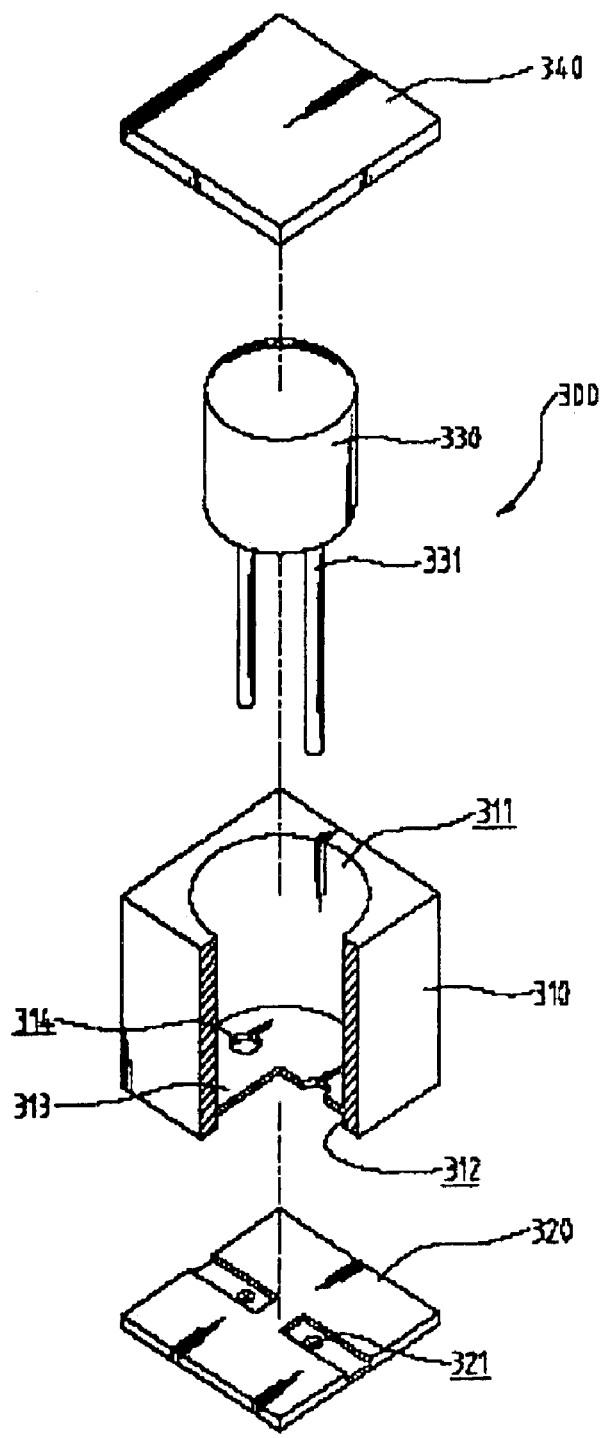
FIG. 2 is an exploded perspective view of the first embodiment of the present invention.
Figure 3:
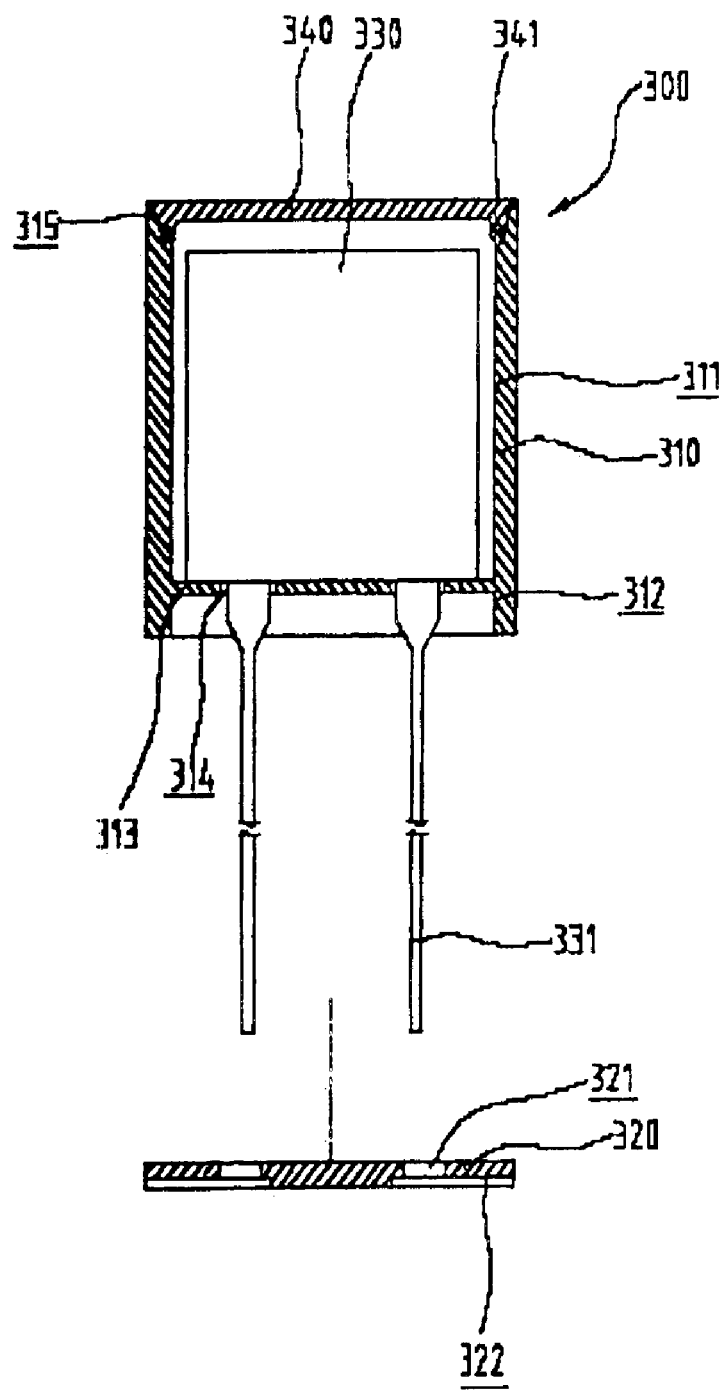
FIG. 3 is a profile showing the bottom cover and the casing cover of the first embodiment of the present invention.

Referring to FIG. 2, the first embodiment of the present invention will be described. An electrolytic capacitor 330 comprises:

A casing cover 310 with a partition 313 inside to separate the casing cover 310 into a dielectric chamber 311 and a buffer chamber 312. The partition 313 has two holes 314 for lead pins 331 of dielectric 330 pass through. The dielectric chamber 311 receives the dielectric 330, and has a rabbet 315 on open side to fix with a top cover 340. Thereby, the dielectric 330 may be set in the dielectric chamber 311 and lead pins 331 can pass through the two holes 314 on the partition 313, then fill with electrolysis in the dielectric chamber 311 so that the lead pins 331 won't be polluted.

A bottom cover 320 covers the buffer chamber 312 to seal, and has two holes 321 for the lead pins 331 of the dielectric 330. On the outside of the bottom cover 320 has chamfer 322. A stuff of epoxide 316 is filled with into the buffer chamber 312 to fix the dielectric 330 and improve strength of structure of the lead pins 331. The stuffing process can be done in a step during manufacturing with no extra installing apparatus needed.

A dielectric 330, comprising 2 lead pins 331, can be normal structure as prior art. The dielectric 330 is installed in the dielectric chamber 311 of the casing cover 310. The lead pins 331 pass through the holes 314 of the partition 313 and the holes 321 of the bottom cover 320.

Figure 4:
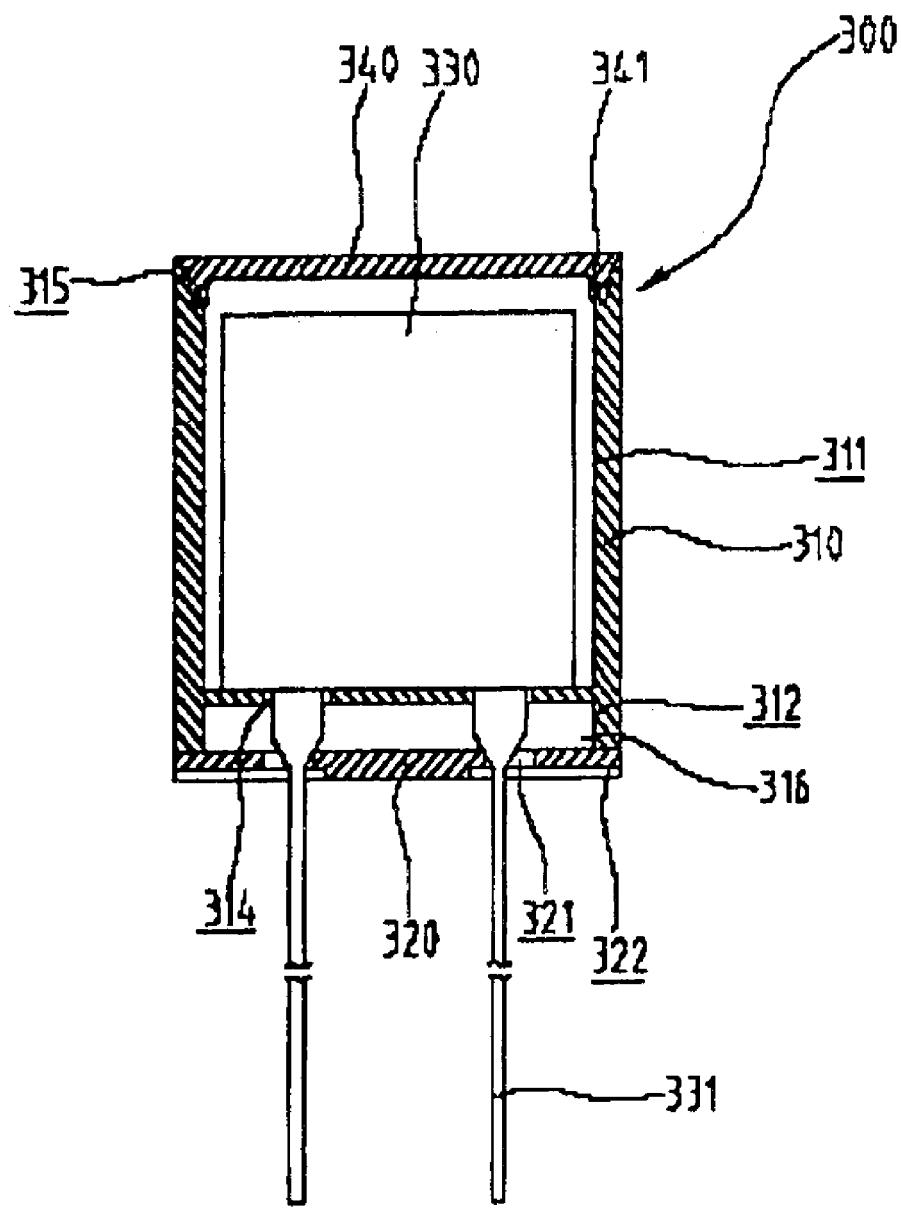
FIG. 4 is a profile of the first embodiment of the present invention.

A top cover 340 comprises a chamfer 341 to fix with the rabbet 315 and seal the dielectric chamber 311 of the casing cover 310. The dielectric 330 is installed in the dielectric chamber 311 and the electrolysis is filled into to produce capacitance, and then seal the dielectric chamber 311 with top cover 340 by supersonic fusing as shown in FIG. 4.

Figure 5:
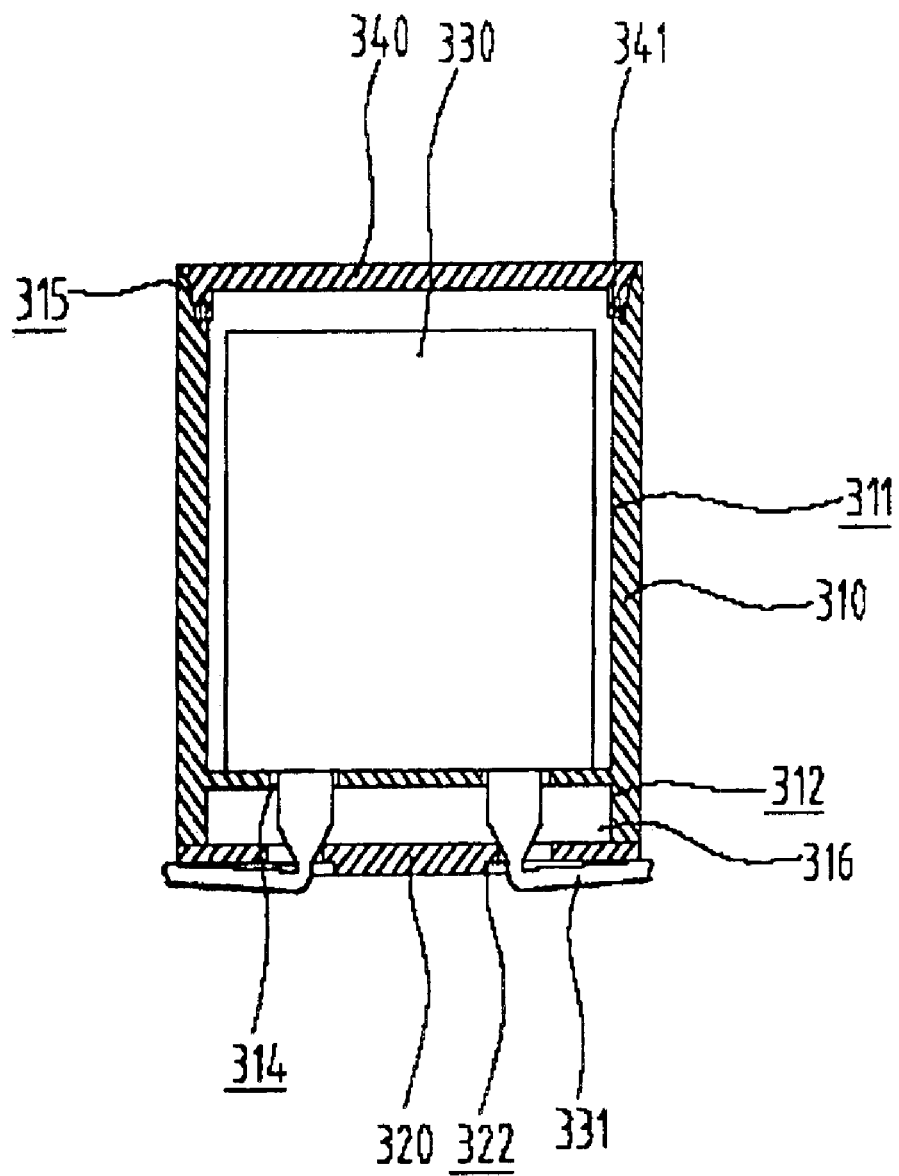
FIG. 5 is a profile showing bended lead pins of the first embodiment of the present invention.

Referring to FIG. 5, the electric conductive lead pins 331 extending out of the bottom cover 320 are treated bending to fit automatic productive process of Surface Mount Technology (SMT). The bended lead pins 331 lie in the chamfer 322 to be Surface Mount Device (SMD).

Figure 6:
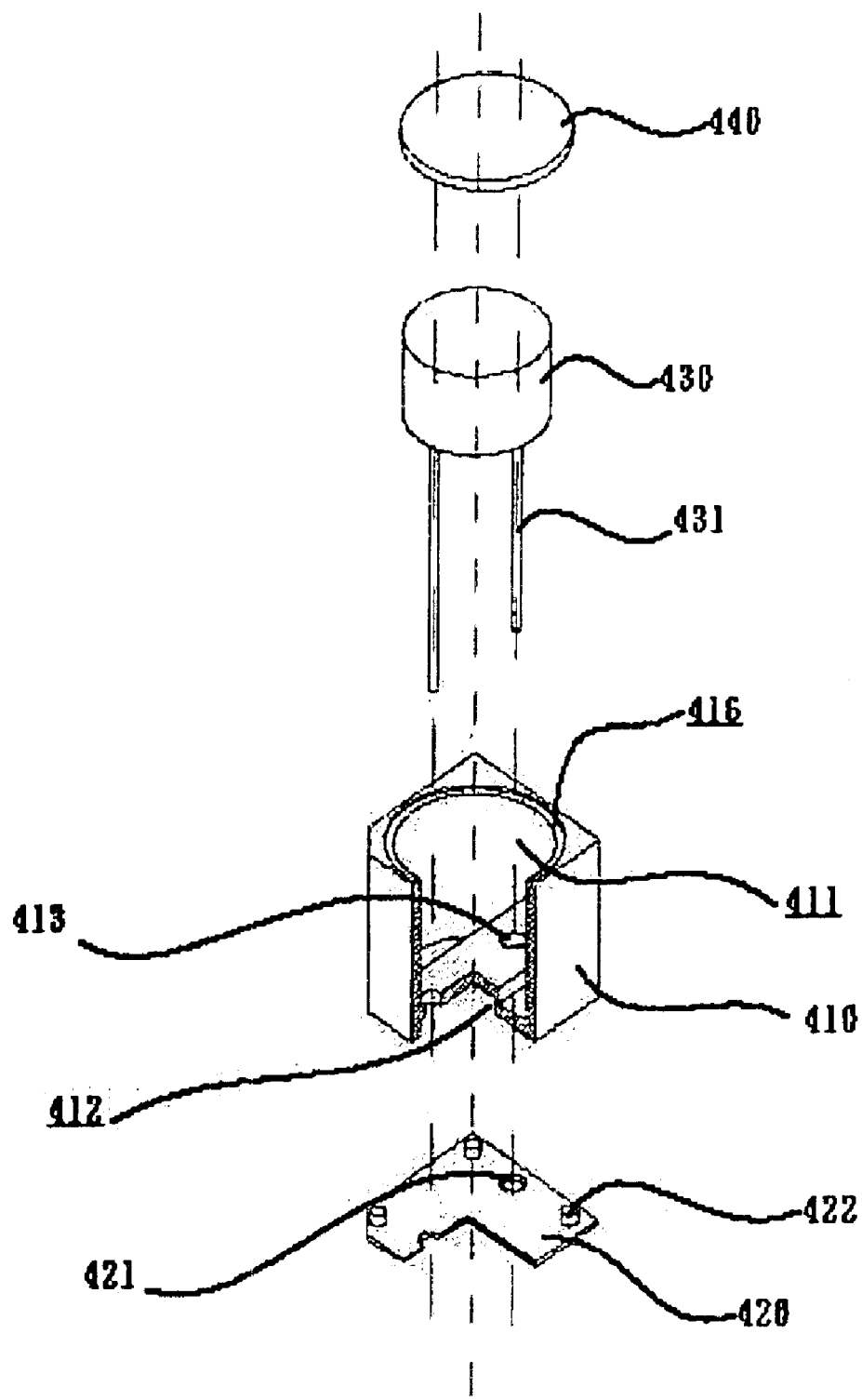
FIG. 6 is an exploded perspective view of the second embodiment in the present invention.
Figure 7:
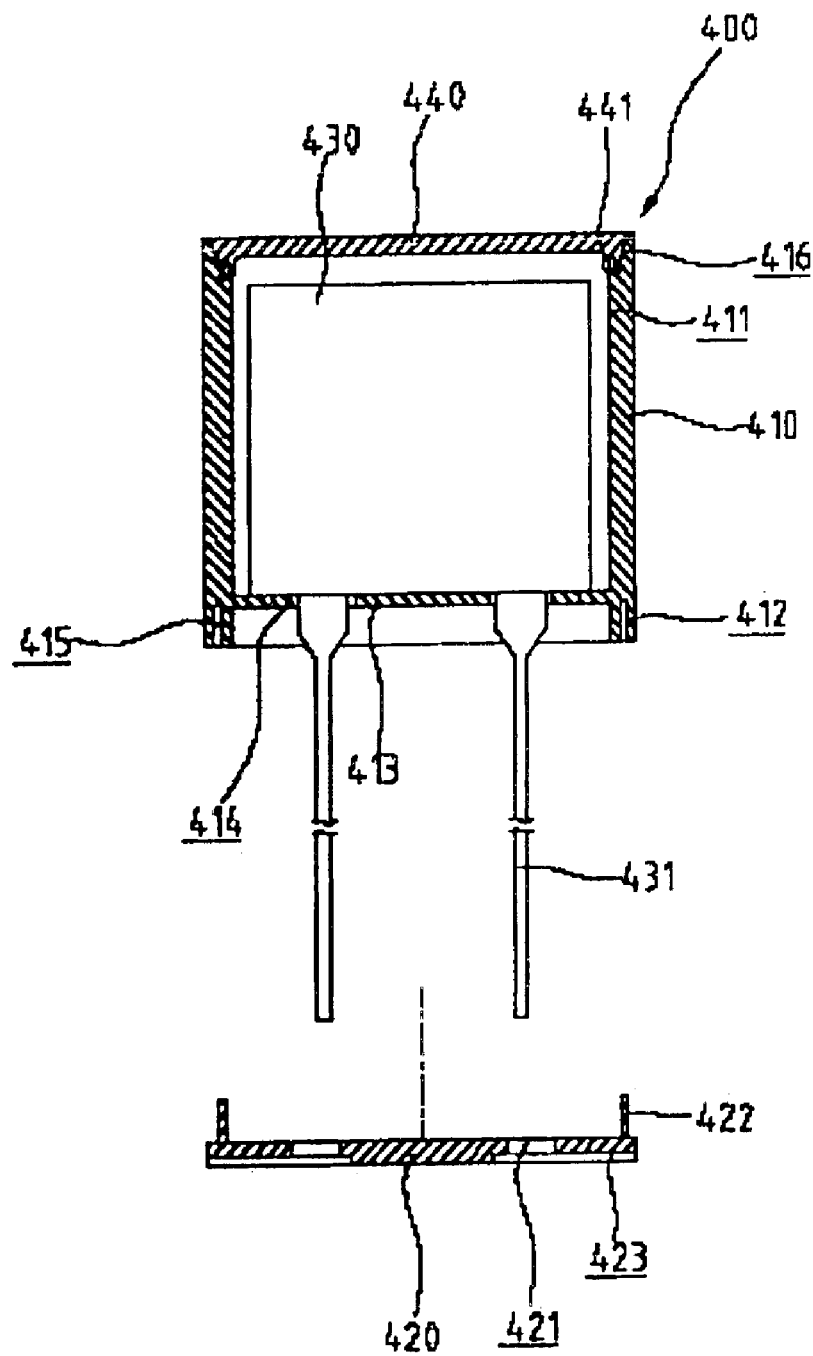
FIG. 7 is a profile showing the bottom cover and the casing cover of the second embodiment of the present invention.

FIG. 6 is an exploded perspective view of the second embodiment in the present invention. An electrolytic capacitor 400 comprises:

A casing cover 410 with a partition 413 inside to separate the casing cover 410 into a dielectric chamber 411 and a buffer chamber 412. The partition 413 has holes 414 for lead pins 431 of dielectric 430 pass through, and four corners on side of the buffer chamber 412 of the casing cover 410 have a socket 415 each, as showing in FIG. 7. The dielectric chamber 411 receives the dielectric 430, and has a rabbet 416 on open side to fix with a top cover 440, wherein the top cover 440 is a nondirectional round plate for easily assembling.

A bottom cover 420 covers the buffer chamber 412 to seal, and has holes 421 for the lead pins 431 of the dielectric 430. In the four corners on inner side of the bottom cover 420 each comprises a bolt 422 to assemble and fix with said sockets 415 of the casing cover 410. On the other side of the bottom cover 420 has chamfer 423 as showing in FIG. 7. A stuff of epoxy resin 417 is filled with into the buffer chamber 412 to fix the dielectric 430 and improve strength of structure of the lead pins 431. The stuffing process can be done in a step during manufacturing with no extra installing apparatus needed.

A dielectric 430, comprising 2 lead pins 431, can be normal structure as prior art. The dielectric 430 is installed in the dielectric chamber 411 of the casing cover 410. The lead pins 431 pass through the holes 414 of the partition 413 and the holes 421 of the bottom cover 420.

Figure 8:
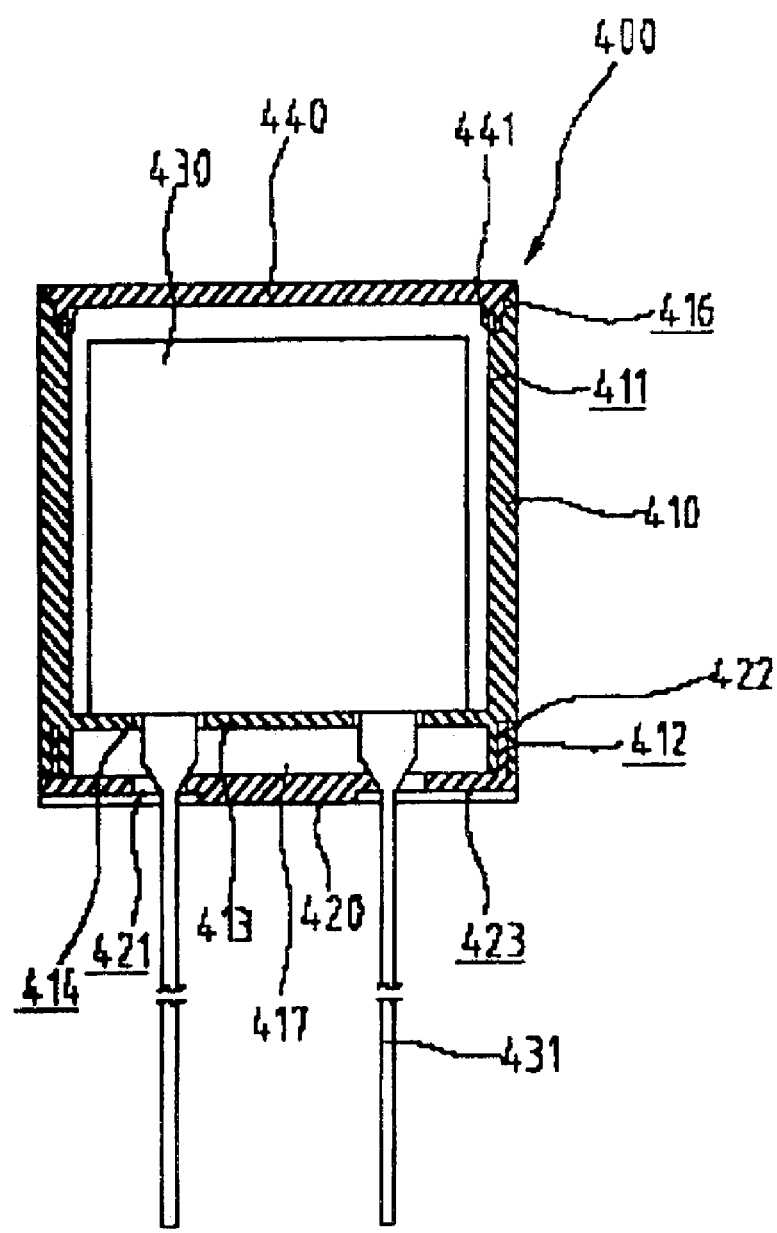
FIG. 8 is a profile of the second embodiment of the present invention.
Figure 9:
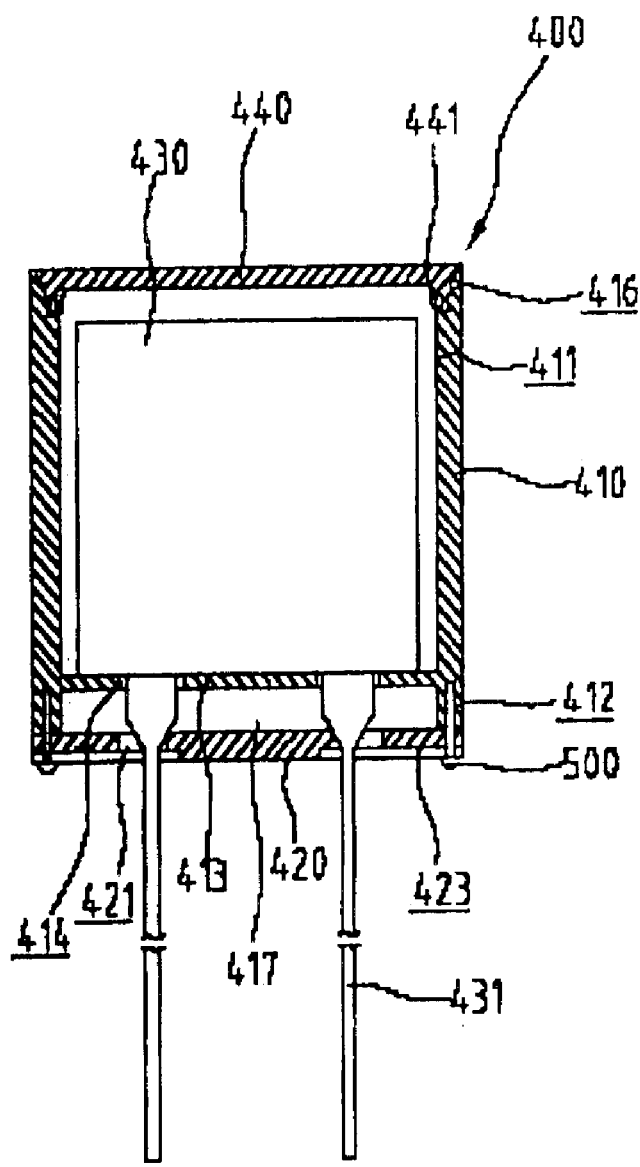
FIG. 9 is an exploded perspective view of the third embodiment of the present invention showing the bottom cover and the casing cover fabricated with rivet.

A top cover 440 comprises a chamfer 441 to fix with the rabbet 416 and seal the dielectric chamber 411 of the casing cover 410. The dielectric 430 is installed in the dielectric chamber 411 and the electrolysis is filled into to produce capacitance, and then seal the dielectric chamber 411 with top cover 440 by supersonic fusing as showing in FIG. 8 or by rivet 500 as showing in FIG. 9.

Figure 10:
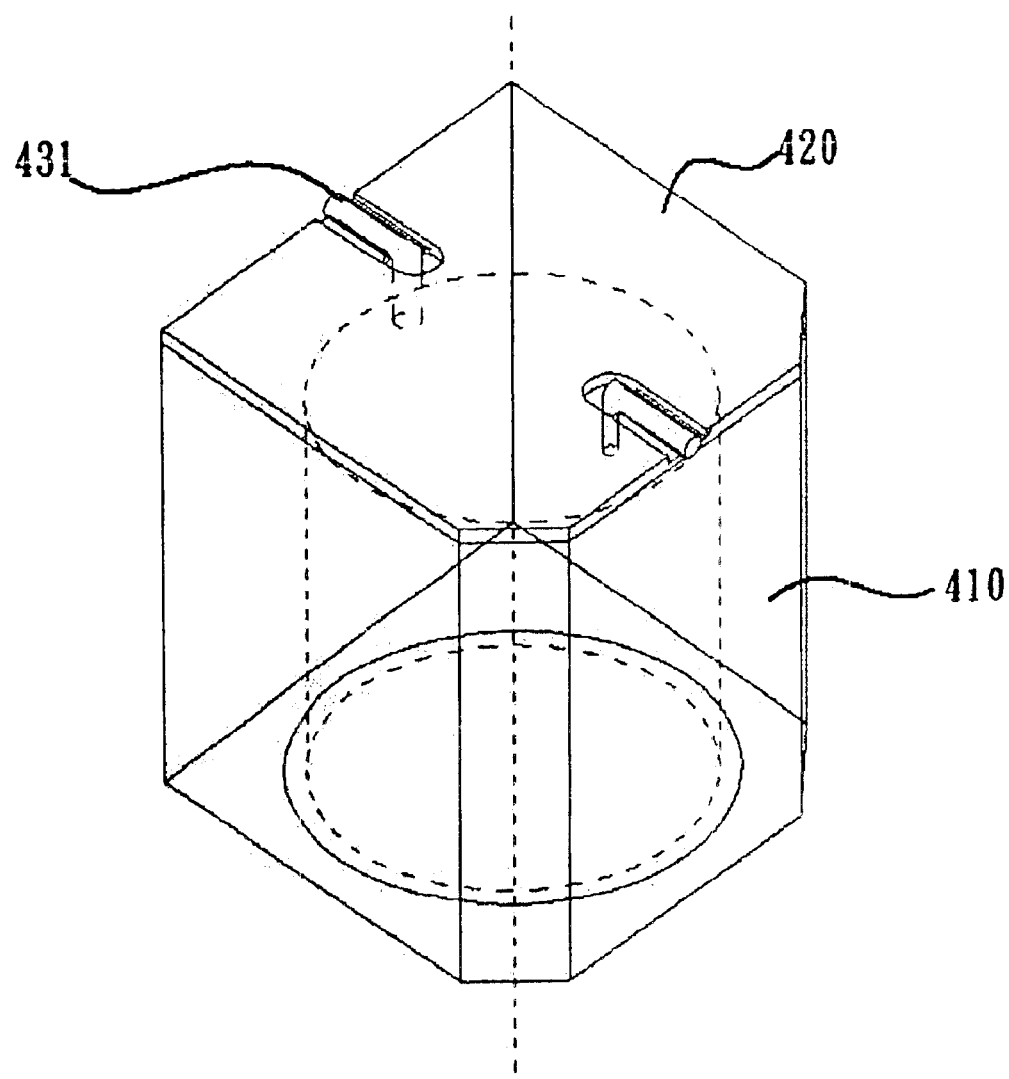
FIG. 10 is a bottom view of the second embodiment of the present invention.
Figure 11:
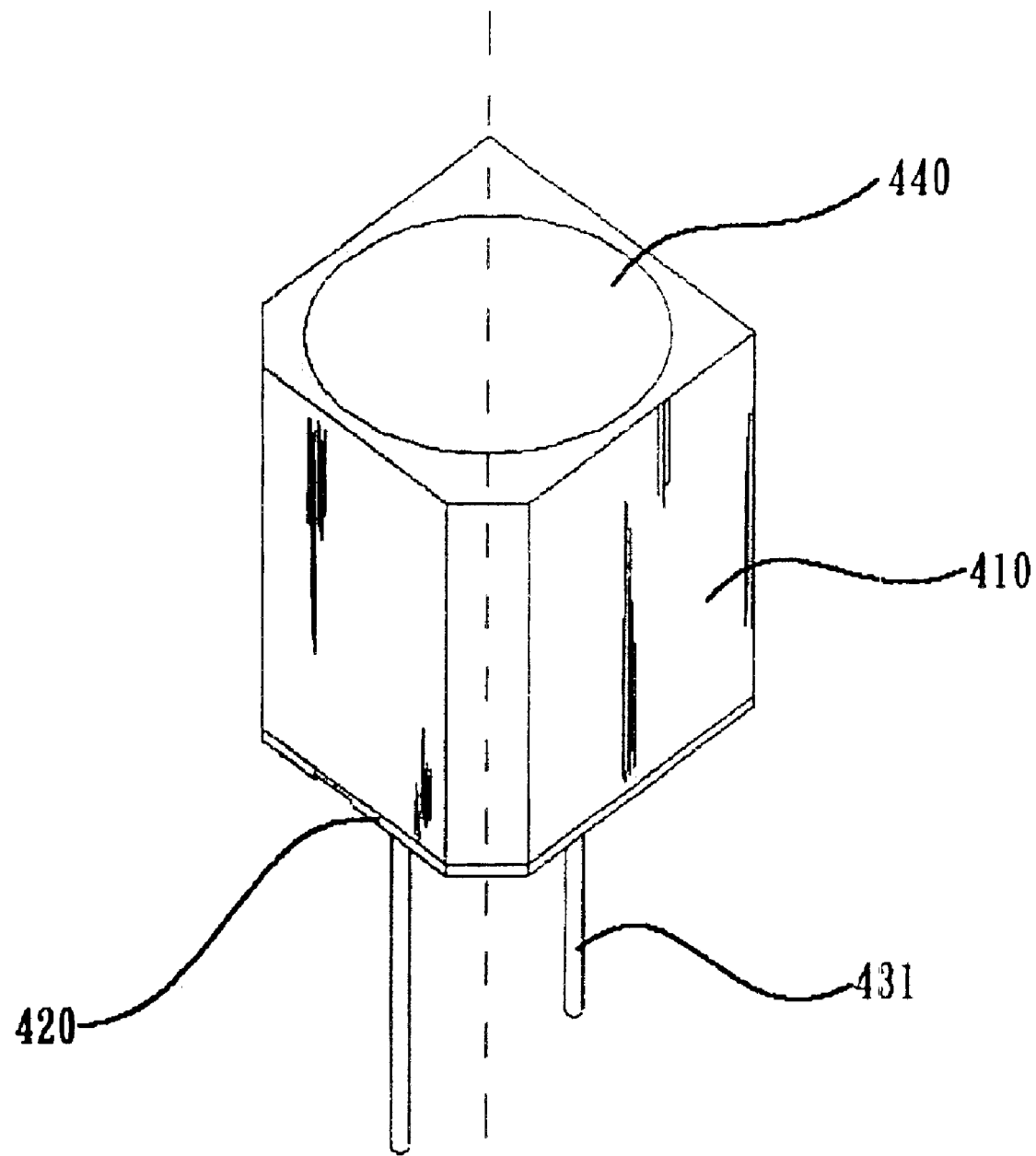
FIG. 11 is a top view of the second embodiment of the present invention.

In FIG. 10 is a bottom view and FIG. 11 is a top view of the second embodiment of the present invention. The lead pins 331 and 431 of the electrolytic capacitors 300 and 400 comprise different of anode and cathode and cannot be welded in reverse to connect. In FIG. 10 discloses only one demonstrative method, which cuts two neighbor corners to mark anode or cathode.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications intend to embrace within the scope of the invention as defined in the appended claims.

What is claimed is:

1. A structure of chip type electrolytic capacitor comprises:

a casing cover, wherein inside has a partition to separate space of casing cover into a dielectric chamber and a buffer chamber, and the partition has holes for lead pins of dielectric pass through;

a bottom cover, which covers the buffer chamber to seal, and has holes for lead pins of dielectric;

a dielectric, which is installed in said dielectric chamber and comprises two lead pins pass through said holes of said casing cover and said bottom cover;

a top cover, which covets the dielectric chamber to seal, which is characterized in that the buffer chamber fills with a stuff of epoxide to fix and pack the dielectric and the lead pins.

2. The structure of chip type electrolytic capacitor of claim 1, wherein the dielectric chamber comprises a rabbet to seal with said top cover.

3. The structure of chip type electrolytic capacitor of claim 1, wherein the bottom cover comprises a chamfer to lay the bended lead pins in to be Surface Mount Device.

4. The structure of chip type electrolytic capacitor of claim 1, wherein the top cover comprises a chamfer to fix with the rabbet of the casing cover.

5. The structure of chip type electrolytic capacitor of claim 1, wherein sealing the casing cover, the top cover and the bottom cover by supersonic welding.

6. The structure of chip type electrolytic capacitor of claim 1, wherein the casing cover and bottom cover is sealed by riveting.

7. The structure of chip type electrolytic capacitor of claim 1, wherein the casing cover comprises a socket at each corner on side of the buffer chamber.

8. The structure of chip type electrolytic capacitor of claim 1, wherein the bottom cover comprises a bolt at each corner on its inner side to fit with said socket.

9. The structure of chip type electrolytic capacitor of claim 1, wherein the casing cover has two neighbor corners cut to mark anode or cathode.

10. The structure of chip type electrolytic capacitor of claim 1, wherein the top cover is a nondirectional round plate and easy to assemble.

* * * * *